United States Patent
Giro Amigo (10) Patent No.: US 10,717,590 B2
(45) Date of Patent: Jul. 21, 2020

(54) BAG SUITABLE FOR PACKAGING OF FRUIT AND VEGETABLE PRODUCTS AND MEANS FOR ITS MANUFACTURE

(71) Applicant: Girnet Internacional, S.L., Badalona (ES)

(72) Inventor: Ezequiel Giro Amigo, Badalona (ES)

(73) Assignee: Girnet Internacional, S.L., Badalona (ES)

( * ) Notice: Subject to any disclaimer, the term of this patent is extended or adjusted under 35 U.S.C. 154(b) by 22 days.

(21) Appl. No.: 15/643,699

(22) Filed: Jul. 7, 2017

(65) Prior Publication Data
US 2018/0009599 A1    Jan. 11, 2018

(30) Foreign Application Priority Data

Jul. 8, 2016    (ES) ................ 201630891 U
Jun. 9, 2017    (ES) ................ 201730690 U (51) Int. Cl.
*B65B 9/20*    (2012.01)
*B65B 61/14*    (2006.01)
(Continued)

(52) U.S. Cl.
CPC ............ *B65D 85/345* (2013.01); *B29C 65/24* (2013.01); *B29C 66/8122* (2013.01); *B29C 66/8145* (2013.01); *B29C 66/8491* (2013.01); *B65D 29/04* (2013.01); *B65D 33/01* (2013.01); *B65D 33/06* (2013.01); *B65D 33/065* (2013.01); *B29C 65/02* (2013.01); *B29C 65/745* (2013.01); *B29C 66/1122* (2013.01); *B29C 66/304* (2013.01); *B29C 66/431* (2013.01); *B29C 66/4312* (2013.01); *B29C 66/472* (2013.01); *B29C 66/73921* (2013.01); *B29C 66/81433* (2013.01);
(Continued)

(58) Field of Classification Search
CPC ............ B29C 66/8145; B29C 66/849; B29C 66/8491; B65D 85/345; B65D 29/04; B65D 33/01; B65D 33/06; B65D 33/065
USPC ............................. 219/117.1, 78.01, 78.02; 156/580–583.91; 493/189
See application file for complete search history.

(56) References Cited

U.S. PATENT DOCUMENTS 3,492,775 A * 2/1970 Grevich ................ B65B 9/13
                                                                 383/37
3,731,454 A * 5/1973 Crabb ................ B65B 57/04
                                                                 53/55

(Continued)

FOREIGN PATENT DOCUMENTS

EP          844175 A1 * 5/1998

*Primary Examiner* — Praachi M Pathak
(74) *Attorney, Agent, or Firm* — Sughrue Mion, PLLC (57) ABSTRACT

A bag (100) suitable for packaging fruit and vegetable products (2) comprising a casing (103) capable of housing the products to be packaged and at least one first band (104) and one second band (105) each arranged on the outer face of the casing so as to seal said casing, the first band (104) being joined to the casing only at its ends (104*a*, 104*b*) forming a handle (106) and the second band (105) joined along the length thereof to the associated face of the casing, forming a stable bottom (105*c*). A station (1) for producing this bag (100) comprises an expansion device (4) of tubular material comprising an upper expansion body (4*a*) and a lower expansion body (4*b*) mechanically linked to each other with a capacity for movement of one with respect to the other and that cooperate with welding groups.

15 Claims, 6 Drawing Sheets

(51) Int. Cl.
  *B65D 33/06* (2006.01)
  *B65D 85/34* (2006.01)
  *B29C 65/24* (2006.01)
  *B29C 65/00* (2006.01)
  *B65D 30/06* (2006.01)
  *B65D 33/01* (2006.01)
  *B29C 65/02* (2006.01)
  *B29C 65/74* (2006.01)
  *B29L 31/00* (2006.01)

(52) U.S. Cl.
  CPC ..... *B29C 66/83221* (2013.01); *B29C 66/8511* (2013.01); *B29L 2031/7128* (2013.01)

(56) References Cited

U.S. PATENT DOCUMENTS

| | | | | |
|---|---|---|---|---|
| 4,091,595 A * | 5/1978 | Pelster | ................. | B65B 9/13 493/197 |
| 4,313,781 A * | 2/1982 | Rovigo | ................. | B26F 3/06 156/269 |
| 4,587,795 A * | 5/1986 | Yamashita | ........... | B65B 9/2042 222/504 |
| 4,589,247 A * | 5/1986 | Tsuruta | ............... | B65B 51/303 53/550 |
| 4,604,854 A * | 8/1986 | Andreas | ............... | B65B 9/2028 141/392 |
| 4,697,403 A * | 10/1987 | Simpson | ............... | B65B 9/2042 53/551 |
| 4,829,745 A * | 5/1989 | Behr | ...................... | B65B 9/20 53/451 |
| 4,954,206 A * | 9/1990 | Voss | ...................... | B29C 65/18 156/537 |
| 5,255,497 A * | 10/1993 | Zoromski | ............ | B65B 9/2021 53/551 |
| 5,768,852 A * | 6/1998 | Terminella | ............... | B65B 9/20 53/133.4 |
| 5,865,941 A * | 2/1999 | Focke | ................ | B29C 66/0042 156/443 |
| 6,199,351 B1 * | 3/2001 | Mount | ..................... | B65B 1/02 53/386.1 |
| 6,574,940 B2 * | 6/2003 | Dauder Guardiola | .... | B65B 9/13 493/226 |
| 6,588,184 B2 * | 7/2003 | Bussey, Jr. | ........... | B65B 9/2021 53/551 |
| 7,100,658 B2 * | 9/2006 | Giro Amigo | ........... | B65B 9/20 156/496 |
| 7,299,608 B2 * | 11/2007 | Kohl | ....................... | B65B 9/20 53/201 |
| 7,640,715 B2 * | 1/2010 | Hefner | ................. | B65B 9/2028 53/389.2 |
| RE42,176 E * | 3/2011 | Giro Amigo | ........... | B65B 5/022 156/496 |
| 2001/0049924 A1* | 12/2001 | Dauder Guardiola | .... | B65B 9/13 53/567 |
| 2004/0238128 A1* | 12/2004 | Giro Amigo | ........... | B65B 5/022 156/494 |
| 2012/0020587 A1* | 1/2012 | Giro Amigo | .......... | B65D 29/04 383/8 |
| 2015/0052857 A1* | 2/2015 | Hefner | ..................... | B65B 1/02 53/551 |
| 2018/0009599 A1* | 1/2018 | Giro Amigo | ........... | B29C 65/24 |

* cited by examiner

BAG SUITABLE FOR PACKAGING OF FRUIT AND VEGETABLE PRODUCTS AND MEANS FOR ITS MANUFACTURE

TECHNICAL FIELD OF THE INVENTION

The invention relates to a bag particularly suitable for packaging fruit and vegetable products of the type that comprises a tubular casing made of mesh sealed at its ends by means of the juxtaposition and mutual joining of bands, with the interposition of the mesh casing, each arranged externally on a face of the casing.

The invention also relates to a station for producing bags for a manufacturing and packaging machine of products in bags, particularly suitable for producing the bag that is object of the invention.

BACKGROUND OF THE INVENTION

Through patent document ES 2122490 a mesh bag is known comprising a tubular mesh casing having, longitudinally arranged and on the outer side, a handle of resistant synthetic material welded at its ends to the ends of said tubular casing coinciding with the weldings themselves for sealing of the casing.

To assist in sealing the casing, it comprises pieces of plastic band located on the ends and outside the tubular mesh, opposite the ends of the strap that acts as a handle, such that the sealing of said casing is sought by juxtaposing and mutually joining the ends of the handle and these pieces of band with interposition of the mesh forming the casing at each end of said casing.

In some cases when gripping the bag by the handle or when handling the bags during storage or transport, the weight of the products housed in the casing can cause a twisting effect therein such that it can prevent the bag from being exposed in a satisfactory way or that carrying it may not be as comfortable as expected even though the bag has a handle.

Similarly, when the bag is gripped by the handle, the mesh material must support the entire weight of the product housed inside, so that the thickness and size of the mesh must be selected correctly ensuring that it will hold without breaking. Furthermore, the joint between the ends of the strap forming the handle and the tubular mesh must be carried out such as to ensure that said joint will withstand or resist the weight of the products. All of the foregoing means that certain features of the bag must be excessively oversized.

A known type of machine for manufacturing mesh bags based on the supply of a continuous tubular mesh is one which comprises a station for producing bags with an expansion device or expander core, arranged in floating and vertical manner on the inside of the tubular mesh and supported by at least one pair of rotating rollers outside the mesh, the shafts of which are integral with the machine.

This expansion device is configured to cooperate with welding groups arranged one on each side of the expansion device, and which, when actuated, ensure the joining of the expanded tubular mesh as it passes through the expansion device and a sheet material which is placed outside the tubular mesh.

Conventionally, the station for producing bags is further equipped with a sealing device of the tubular mesh, gathering and joining together the wall thereof through thermo welding or by other means. Usually, the sealing of the tubular mesh is made to coincide with a portion of the tubular mesh having sheet material attached, on one or both sides thereof, in order to reinforce the sealing and prevent tearing of the mesh at this point. Also conventionally, the station for producing bags is equipped with a cutting device, downside of the sealing device, which transversally cuts the mesh immediately below the sealing area in order to individualize a bag of continuous mesh, bag that remains open at the top but closed at the bottom through previous actuation of the sealing device.

An example of a station for producing bags having these characteristics is described in patent document ES2188389.

The individualized bag is transferred to other stations of the machine, where it will be filled and subsequently sealed by gathering and joining together the walls of the bag in the vicinity of its upper opening.

The type of bags to be produced may vary according to whether the sheet material is applied only on one side or on both sides of the tubular mesh, in the station for producing bags. Similarly, different bags can also be produced depending on whether the sheet material is joined to the body of the mesh along the entire length of a bag or only coinciding with the bottom thereof and the upper opening.

Each of these alternatives requires the use of different welding groups. To that end, in order for a station for producing bags to be sufficiently versatile and capable of making different types of bags, it is possible to equip the station for producing bags with an upper welding group and a lower welding group, of a different typology, and enable the station for producing bags so that the expansion device can be easily replaced, according to whether the latter should cooperate with the upper welding group in order to manufacture a version of the bags, or with the lower welding group in order to manufacture other versions of the bags.

In some cases, the bags, such as those that are object of the present invention, do not necessarily have to be symmetrical, that is, the relationship between the laminar sheet and the tubular mesh may be different on either side of the tubular mesh. Thus, bags with interesting added benefits can be obtained.

The production of these versions of the bags in a station for producing bags as described above is not well resolved because it requires the use of an upper welding group arranged on one side of the tubular mesh and a lower welding group arranged on the opposite side of the tubular mesh, requiring the simultaneous use of two expansion devices when the station is only able to support one of these at a time.

The first objective of the invention is a station for producing bags capable of overcoming this drawback.

It is also an objective of the invention to maintain the production rate of the station for producing bags even when the bag being produced is of the type that requires operating with both welding groups at different levels.

DESCRIPTION OF THE INVENTION

The bag, object of the invention, replaces the pieces of band which characterize the bag according to ES 2122490 by a continuous band that links the two ends of the casing, this band being further joined along its length to the associated face of the casing, forming a stable bag bottom for the contents of the casing when the bag is held suspended from the handle. This bag bottom, besides contributing to hold the weight of the products endows the bag with a stability that is of interest for its use and that is favorable for the good performance of the bag.

Thus, the bag of the invention is a breathable bag especially suitable for packaging fruit and vegetable products comprising a tubular mesh casing, capable of housing the products to be packaged, and at least one first band and one second band each arranged on the outer face of the casing and joined together at their ends, with the interposition of ends of the casing, such that they seal said tubular casing. The bag is characterized in that the first band is joined to the casing only at its ends such that a central portion thereof is able to be separated from the casing forming a handle; the second band is joined along its length to the associated face of the casing, forming a stable bottom for the contents of the casing when the bag is held suspended from the handle.

In the context of the present invention, tubular mesh should be understood as a mesh obtained in tubular fashion, or an originally flat mesh whose opposing side edges gathered and joined together form a tube. Similarly, the mesh may be an extruded mesh or a woven mesh without these versions affecting the essence of the invention.

The second band may be joined to the associated face of the casing in continuous or intermittent fashion, ensuring in any case that this second band cannot be separated and slid transversally with respect to the casing, remaining stuck thereto.

Preferably, the second band is joined to the associated face of the casing by two longitudinal joining strips, arranged at or near its longitudinal edges.

The second band can provide the bag with a generous bottom, on which the products accumulate. Thus, the invention contemplates that the second band be a band having parallel longitudinal edges that determine a bandwidth h whose ratio to the perimeter l of the tubular casing is $h/l \geq 0.2$.

In a variant of the invention, said first and second bands are flattened and have similar widths at their ends of mutual joining with interposition of the mesh. Twisting of the casing is prevented when the aforementioned proportions are respected.

According to a variant of interest, the central portion of the first band has a width that is significantly smaller than the width of the joining ends thereof, with interposition of the mesh, with the second strip, such that it ensures good joining and prevents the casing from twisting, while at the same time it provides the handle with an ergonomic grip portion.

Preferably, both first and second bands are made of a plastic material suitable for their mutual joining through thermo welding.

The inventors also propose a station for producing bags particularly suited to producing the bag, which is the object of the invention.

The station is of the type comprising an expansion device made of flexible tubular material, from which the tubular casing of the bags is obtained, is intended to remain inserted vertically and floating inside said tubular material while producing the bags, and for which the station is equipped with means of support on which the mentioned expansion device rests, although with the interposition of tubular material supplied while producing the bags and, if applicable, also of sheet material, for example in the shape of a band or bands.

In essence, this station is characterized in that the expansion device comprises an upper expansion body, intended to cooperate with at least one upper welding group for joining the expanded tubular material, as it passes through this upper expansion body, with the sheet material arranged between said tubular material and the upper welding group; and a lower expansion body, intended to cooperate with at least one lower welding group for joining the expanded tubular material, at it passes through this lower expansion body, with the sheet material arranged between said tubular material and the lower welding group, the upper and lower expansion groups being mechanically linked to one another with capacity of movement respect to each other.

The expansion device thus provides support surfaces at different levels for cooperating with welding groups that may be different and arranged at different levels, which increases the versatility of the station for producing bags making it capable of producing several different types of bags, naturally including the bag that is object of the present invention.

Furthermore, the partition of the expansion device into two bodies, though linked mechanically, enables implementing the invention in a simple way without altering or having to modify the means of support being used in a conventional manner. In other words, it is not necessary to use means of support at a different level, each suitable for receiving the support of a different expansion device.

The capacity for movement between the two expansion bodies, the upper expansion body and the lower expansion body, of the expansion device further enables actuation of the welding groups on the expansion device, at different levels, without impairing the precision of the operations, since it allows a certain automatic accommodation of each expansion body when requested by the welding plates of the welding groups at their level during their actuation.

The mechanical link between the upper and lower expansion bodies can be in the form of an articulated joint. In one embodiment, the upper and lower expansion bodies are joined in an articulated manner around a transversal shaft, which becomes horizontal when the expansion device rests on the means of support.

According to a variant of the invention, the expansion device rests on the means of support through support of the upper expansion body on said means of support, with the lower expansion body being suspended from the upper expansion body.

To that end, the expansion device may be equipped with a pair of rotating rollers around parallel rotating shafts, at a same level, positioned at the lower end of the upper support body.

The arrangement of these rotating rollers in the upper expansion body may be such that the upper end of the lower expansion body is arranged therebetween.

In one embodiment of the station, by resting the expansion device on the means of support, the upper expansion body offers one first and one second opposing upper support faces, each of which can used for support tubular material and sheet material for joining, and against which, in this case, the welding plates of the corresponding first and second upper welding groups actuate, arranged at the same level and between which the upper expansion body is located; and the lower expansion body offers one first and one second opposing lower support faces, each of which can be used for support tubular material and sheet material for joining, and against which, in this case, the welding plates of the corresponding first and second lower welding groups actuate, arranged at the same level and between which the lower expansion body is located, the station for producing bags being prepared to both actuate or to actuate and operate said welding groups individually, simultaneously or coordinately.

In an embodiment of interest, the station is capable of operating a single upper welding group, on one side (L) of the expansion device and a single lower welding group, which is arranged on the other side (R) of the expansion device, and in addition, it is capable of doing so simultaneously.

By operating it is understood that in addition to actuating the welding plates associated to the welding group, moving them towards the expansion device, supplying heat thereto so as to be able to join tubular material and sheet material by thermo welding, said material having been arranged between said welding plates and the expansion device. This particular form of action is of interest for producing the bag object of the present invention.

According to a constructive solution, the lower expansion body comprises two parallel plates that determine two major opposing faces in the lower expansion body, each suitable for cooperating with a lower welding group, said plates being joined to one another, freeing the space that separates them along the entire length of at least their lateral edges, thus determining vertical slots that enable the formation of individual folds in the tubular material that surrounds it while the bags are being produced.

In a variant, said plates have a window in which a cover is placed, the outer surface of which is a covering material that provides non-stick properties and high resistance to heat. This covering material may be made of polytetrafluoroethylene (PTFE).

According to a constructive solution, the upper expansion body comprises a rigid support frame for two pairs of welding backs, each pair of welding backs determining a larger face in the upper extension body suitable for cooperating with the associated welding group.

In a variant of interest, the welding backs of a same pair are mounted in a rotating way around a common shaft transverse to the upper expansion body and which is essentially horizontal when the expansion device rests on the means of support. This enables the welding backs to be better accommodated to the welding plates of the upper welding groups.

DETAILED DESCRIPTION OF AN EMBODIMENT

Figure 1:
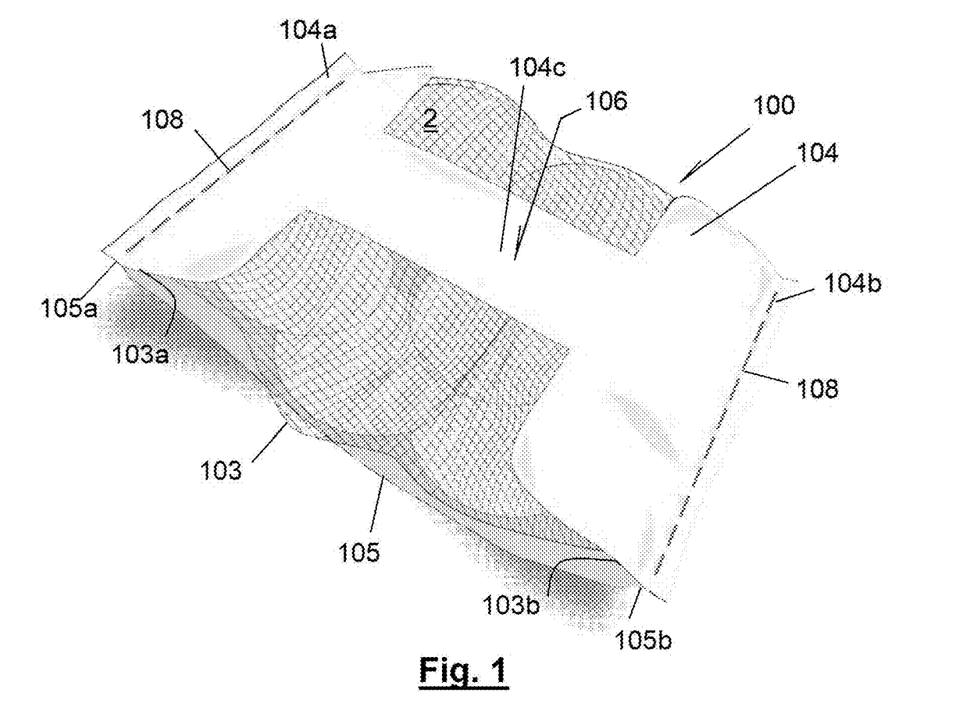
FIGS. 1 and 2 illustrate schematically and from different points of view a bag according to the invention in a rest position.
Figure 2:
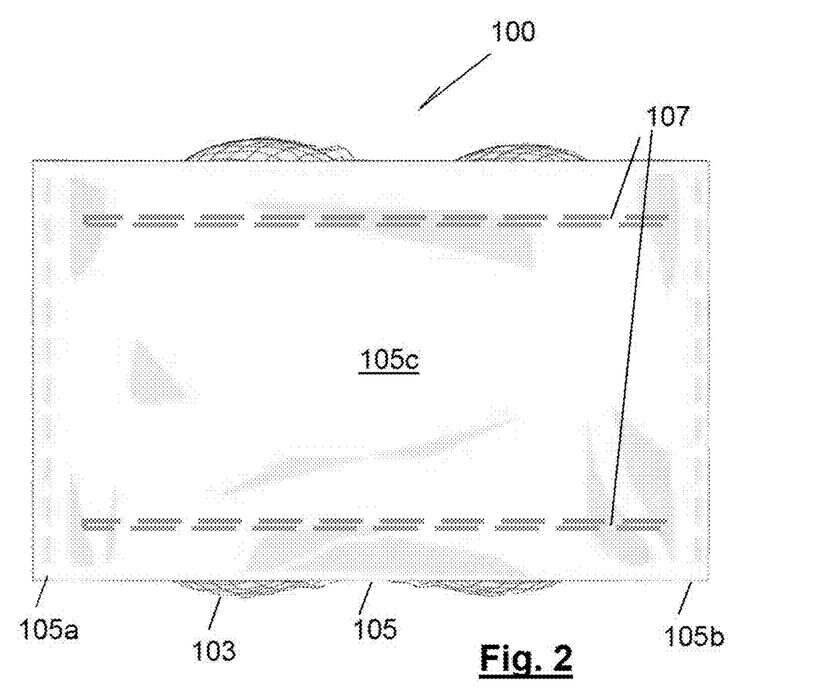

The bag 100 illustrated by way of example in FIGS. 1 and 2 comprises a tubular mesh casing 103 selected from the cross-sectional type of a continuous tube, the ends 103a and 103b of which are closed between one first and one second band 104 and 105 of sheet material, such as thermo-weldable plastic, which are joined to one another by their opposing ends 104a, 105a and 104b, 105b interposing the respective ends 103a and 103b of the casing 103 by means of joints 108 extending transverse to the bands 104 and 105.

In the bag 100, the first band 104 has a central portion 104c that is not joined or otherwise attached in any way to the associated face of the casing 103. With the bag 100 resting on a surface, for example, of exposure (as illustrated in FIG. 1), the first band 104 is naturally positioned smoothly on said face of the casing 103. To this effect, a length is selected for the band 104 similar to the length of the casing 103.

The mentioned central portion 104c of the first band 104 is sized to act as a handle 106, being able to hold and carry the bag 100 gripped by the handle 106.

In these circumstances, the casing 103 will assume a U-shape but in a controlled or assisted manner, in this case through the second band 105. To this end, this second band 105, unlike the first band 104, is joined to the associated face of the casing along its length preventing it from being able to separate therefrom, forming a bag bottom 105c (see FIG. 2) of the bag 100 when it is carried suspended from the handle 106.

This can occur even when the first and second bands 104 and 105 are of the same length, which is very advantageous so as not to alter the usual production systems. By adopting the U-shape, the ends of the bag 100 are brought close together, and as a result, the ends 104a and 104b of the first band 104 are also brought together, which allows the central portion 104c that acts as a handle 106 to separate from the casing 103.

It is of interest that the width of the second band 105 be sufficient in order to provide the bag 100 with optimum stability during transport or to prevent unwanted twisting of the casing 103. To this effect, in a bag 100 having capacity for 6 to 15 pieces of fruit (common format in the marketing of citrus fruit, apples, etc.) it would be desirable to select a band with a width of between 90 and 160 mm as second band 105, with a length that can range between 20 and 40 cm, depending on the number of pieces to be housed in the casing 103.

In practice, the perimeter of the tubular casing 103 for this type of bag, intended to contain fruit and vegetable products, generally ranges from 400 to 600 mm, which means that by taking into account the above-mentioned widths, in a small bag an optimum perimeter/width ratio could be 400/90, which means a coverage of the second band 105 of about 40% of the web casing in the example; and in the case of a large bag, an optimum perimeter/width ratio could be 600/160, which means a coverage of about 25% of the casing 103.

Figure 3:
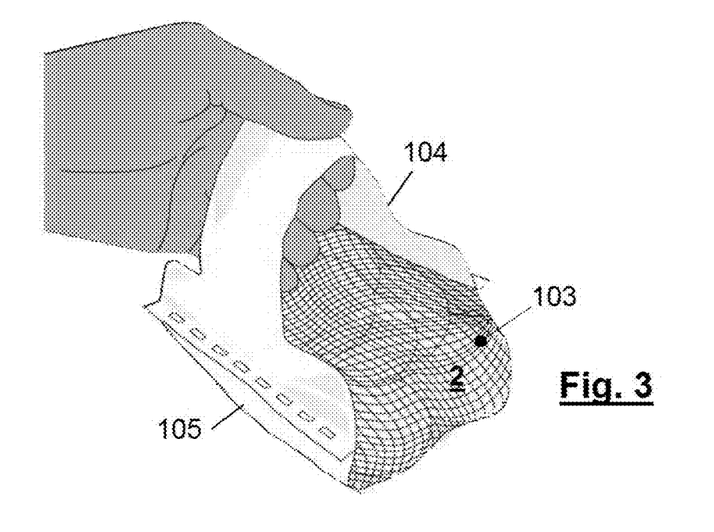
FIG. 3 would show the shape that the same bag adopts during transport when suspended from the handle.

In the example, the second band 105 is a straight band, in which two lateral edges are distinguished and along which, or in the vicinity whereof, there are longitudinal joining strips 107 of this band to the casing 103. The longitudinal strips may be continuous, but it is also contemplated that the joining points with the casing 103 be discreet, intermittent and having another distribution, but inasmuch as possible, ensuring that the second band 105 cannot be moved transverse to the casing 103 and is secured thereto over its entire length so as to be able to carry out the function of a bottom of the bag 100 particularly when it is carried suspended from the handle 106, as illustrated in FIG. 3.

In the example, in the areas of mutual joining the ends 103a, 104a and 103b, 104b of the first and second bands 104 and 105 are flattened and are of the same or similar width and the joining is carried out by melting (for example, by means of ultrasound or through the supply of heat) the materials that form the bands 104 and 105 or by other means such as stapling, gluing, sewing, etc. Conventionally, as described above, the joining areas may extend transversally to the bands 104 and 105.

It should be noted that the first band 104 has a slight narrowing in its central portion 104c, which favors comfortable fastening thereof when it acts as a handle 106.

Figure 4:
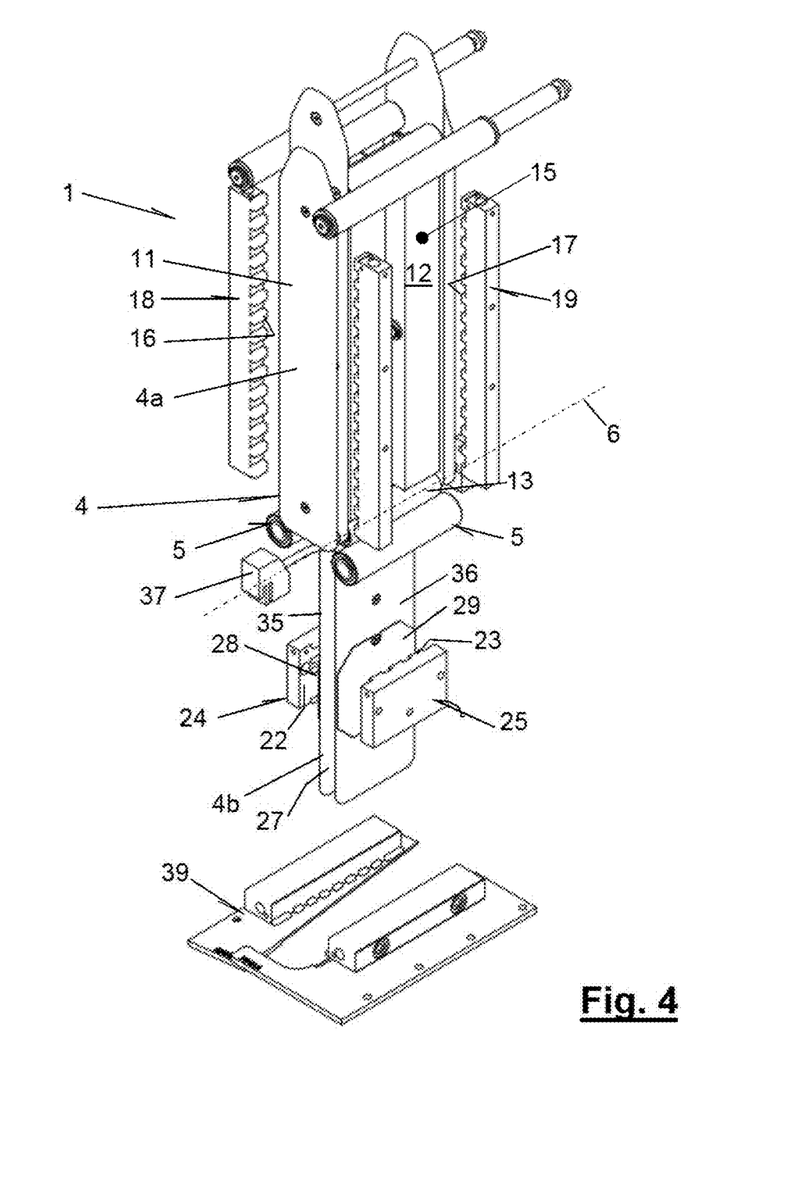
FIG. 4 shows a station for producing the bag according to a variant of the invention.

FIG. 4 shows a station 1 for producing open bags for a machine for manufacturing and packaging products in bags based on the supply of flexible tubular material, such as a woven mesh or a plastic mesh, and of a flexible sheet material in the form of a band or bands.

In a known manner, the station 1 comprises an expansion device 4, or expander core, capable of being arranged in floating position or vertically inside the tubular material when it is supplied to produce bags. For this purpose, the station is equipped with a means of support 5 of the expansion device 4, in the example in the form of two rotating rollers, the shafts of which are supported on a fixed, not shown, component of the station 1.

The expansion device 4 is configured to cooperate with the welding groups capable of procuring the joining of the expanded tubular material with the sheet material as it passes through the expansion device, arranged between said tubular material and the welding groups.

The station 1 of FIG. 4 is particular in that the expansion device 4 comprises an upper expansion body 4a and a lower expansion body 4b joined in an articulated manner around a transverse shaft 6 that is essentially horizontal when the expansion device 4 is supported on the means of support 5. In the example, the expansion device 4 is supported on the means of support 5 by the lower part of the upper expansion body 4a, the lower expansion body 4b being suspended.

In order to allow feeding of the tubular material between the upper expansion body 4a and the means of support 5, said upper expansion body 4a mounts rotating rollers 13 around rotation shafts 13a (see FIG. 6) parallel and at the same level, each of which rests on one of the rotating rollers of the means of support 5.

The upper expansion body 4a is meant to cooperate with a least one upper welding group, and the lower expansion body 4b is meant to cooperate with at least one lower welding group.

Figure 5:
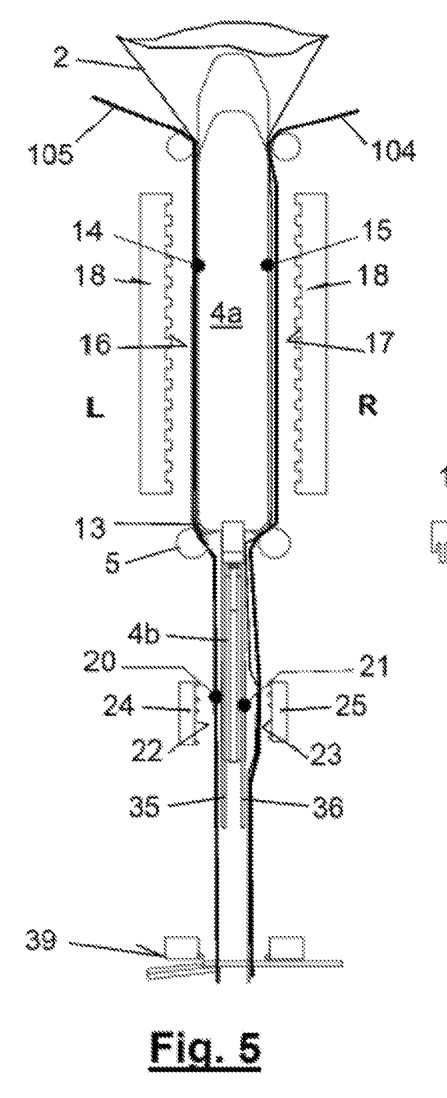
FIG. 5 is a side elevation view of the station shown in FIG. 1 having schematically added the supply of tubular material and the two bands of sheet material from which an open bag can be produced, for example, of the type shown in FIGS. 1 to 3.

In the station 1 of the example, the upper expansion body 4a has one first and one second support faces 14, 15 which are opposite one another (see FIG. 5), each of which can be used to support the tubular material and the sheet material to be joined and against which, in this case, the welding plates 16, 17 of a first and second upper welding groups 18, 19 can actuate, arranged at the same level and between which the upper expansion body 4a is located, all of which can better be appreciated in FIG. 5.

In turn, the lower expansion body 4b also offers one first and one second support faces 20, 21 opposite one another, each of which can be used to support the tubular material 2 and the sheet material to be joined and against which, in this case, the welding plates 22, 23 of corresponding first and second lower welding groups 24, 25 can actuate, arranged at the same level and between which the lower expansion body 4b is located.

The station 1 is prepared both to actuate or to actuate and operate the different welding groups individually, simultaneously or coordinately. As it has been clarified previously, by operating it is understood that in addition to displacing the welding plates associated to the welding group, heat is supplied thereto so as to be able to join tubular material and sheet material by thermo welding, said material having been arranged between said welding plates and the expansion device.

The configuration of the welding plates of the upper and lower welding groups being different, the station 1 allows producing several different types of bags depending on the combination of welding groups operating on the tubular material and the sheet material to be joined together.

The station 1 is particularly advantageous when being actuated and operated simultaneously on the expansion device 4 with several welding groups, of which at least one is the upper welding group and another is the lower welding group.

One example is shown schematically in FIG. 5, suitable for producing a bag 100 as shown in FIGS. 1 to 3. A particular feature of this bag is that the casing 103 can be obtained from a tubular material 2, in the form of woven or plastic mesh, and two bands 104 and 105 of sheet material, each one applied to one side of the tubular material 2 and joined thereto in a different manner: in one case joined along the length of the tubular material 2 forming the casing 103; and in the other case, joined only to the ends of the casing 103. In the example of FIGS. 1 to 3, the bands 104 and 105 of sheet material also have different shapes.

Figure 6:
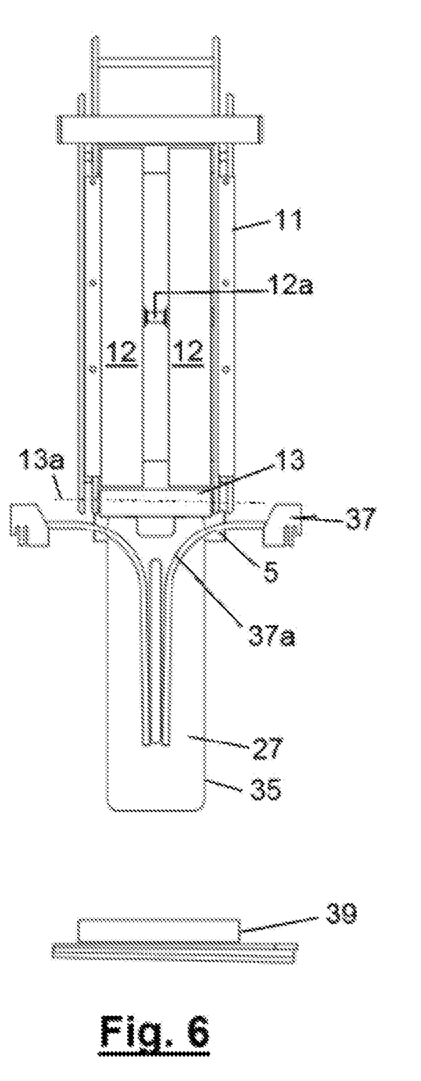
FIG. 6 is a front elevation view of the station shown in FIG. 4 having deprived the lower expansion body of one of the support faces thereof for the tubular material and the sheet material so as to be able to show the relationship thereof with an introducer penetrating into said lower expansion body.

One form for the mass production of this type of bag by means of a station 1 like that of FIGS. 4 to 6 involves supplying the tubular material 2 and the two bands 104, 105 as illustrated in FIG. 5 and simultaneously actuating the welding plates 16, 17 of the first and second upper welding groups 18, 19 against the first and second upper support faces 14, 15 of the upper expansion body 4a, respectively, but operating only with one of the upper welding groups by supplying heat only to the plates of one of these upper welding groups, for example to the plates 16 arranged on a first side L of the expansion device 4; and actuating the welding plates 22 and 23 of the two lower welding groups 24, 25 against the first and second lower support faces 20, 21 of the lower expansion body 4b, but operating only with one of these lower welding groups, supplying heat only to the plate 23 of the welding groups arranged on the side R opposite to the expansion device 4. Thus, in a same working cycle of the station 1, the sheet material 105 is joined along the length of a section of the tubular material 2 forming the casing 103 of a bag in the process of being manufactured on the L side of the expansion device 4; and the sheet material 104 is joined to one of the ends of a section of the tubular material 2 forming the casing of another bag in the course of manufacturing, which precedes the previous bag and onto which the sheet material 105 has already been joined along the length thereof, on the side R of the expansion device.

In addition to the station 1 providing support surfaces at different levels in order to cooperate with different welding groups arranged at a different level, the articulated joint between the upper and lower expansion bodies 4a and 4b makes it possible that the mechanical thrust that may be exerted by the upper welding groups on the support surfaces at its level does not result in a displacement of the lower lever support surfaces causing an undesired mismatch with the associated lower welding groups.

Figures 7, 8:
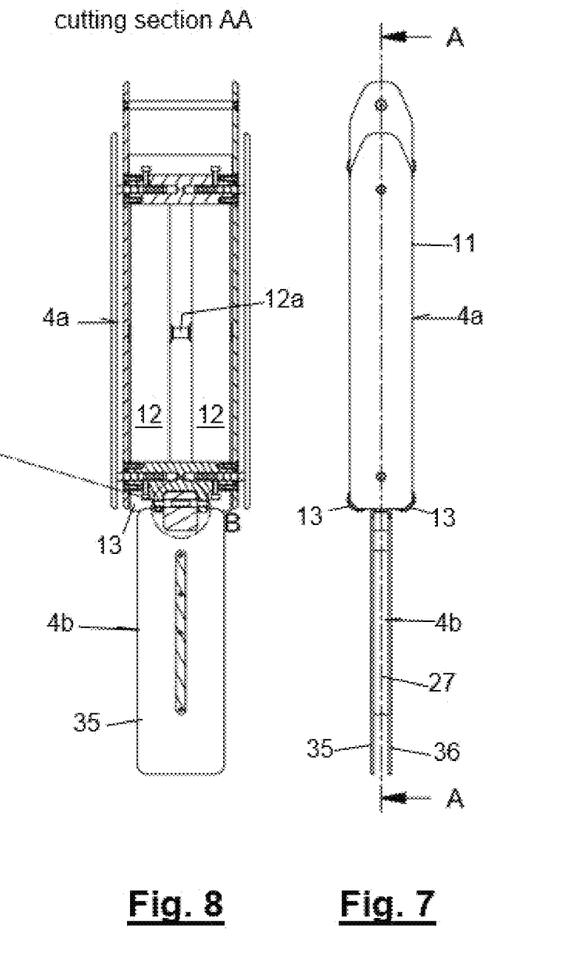
FIG. 7 shows a side elevation of an expansion device of a station according to the invention.
FIG. 8 shows the same expansion device according to cutting plane AA of FIG. 8.
Figure 9:
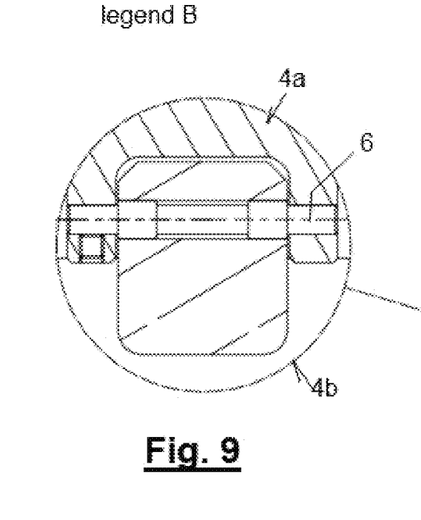
FIG. 9 shows an enlarged view of the area delimited and indicated with legend B in FIG. 8.
Figure 10:
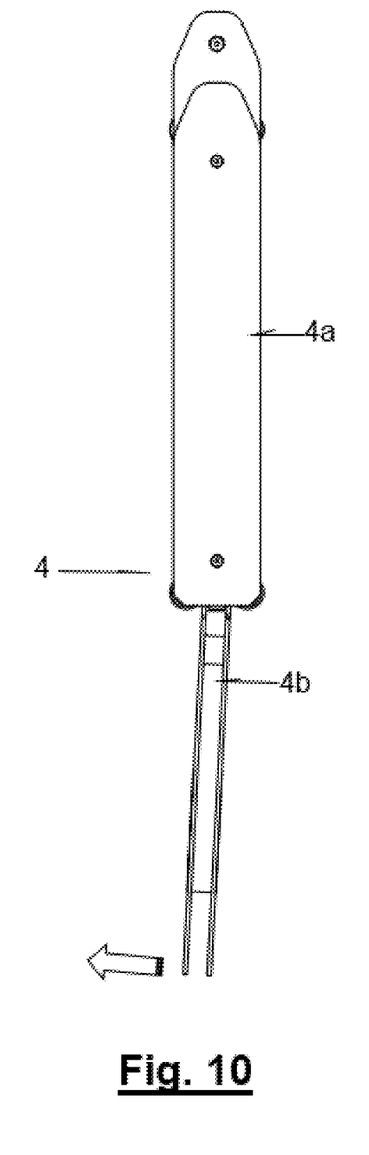
FIGS. 10 and 11 show how the position of the lower expansion body can be varied with respect to the upper expansion body in an expansion device of a station according to the invention.
Figure 11:
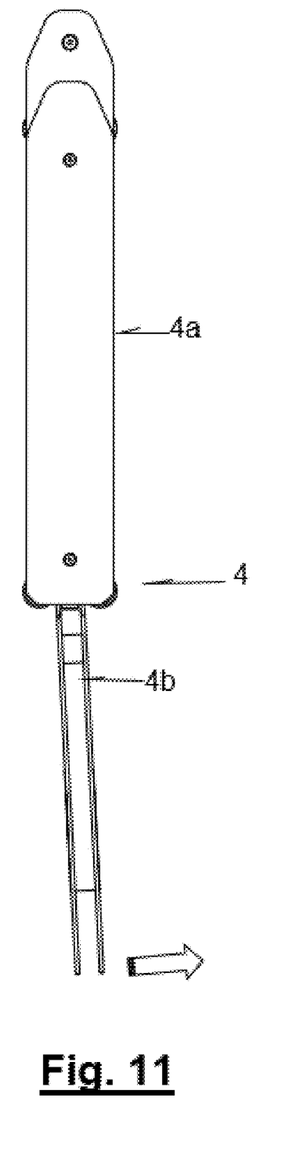

An example of an expansion device 4 with an articulated joint between the upper and lower expansion bodies 4a y 4b is exemplified in FIGS. 7 to 9, and its effect is illustrated in FIGS. 10 and 11.

FIGS. 7, 8 and 9 show that the upper end of the lower expansion body 4b is arranged between the two rotating rollers 13 of the upper expansion body 4a intended to rest, in rotating mode, on the means of support 5 of the station 1. As illustrated in FIGS. 10 and 11, this circumstance does not prevent the rotation of the lower expansion body 4b with respect to the upper expansion body 4a to a sufficient extent so that each of these upper and lower bodies 4a and 4b can be properly aligned with the welding plates of the upper and lower welding groups operating at their level.

In the example of these FIGS. 7, 8 and 9, the upper expansion body 4a comprises a rigid support frame 11 for two pairs of welding backs 12, each pair of welding backs determining one of the support faces 14, 15 in the upper expansion body 4a suitable for cooperating with the welding plates 17, 18 of the first and second upper welding groups 18 and 19, respectively.

The welding backs 12 of a same pair are furthermore mounted in a rotating way around a common shaft 12a, transverse to the upper expansion body 4a, which is essentially horizontal when the expansion device 4 rests on the means of support 5, which also contributes to a better accommodation of the welding plates 17 and 18.

As regards the lower expansion body 4b, in the example it comprises two parallel plates 35, 36, which determine the support faces 20 and 21 in the lower expansion body 4b, opposed to one another, each suitable for cooperating with the plate 22, 23 of a respective lower welding group 24 and 25.

The plates 35 and 36 are joined together freeing the space that separates them along the entire length of at least their lateral edges, thus determining vertical slots 27 that enable the formation of individual folds in the tubular material 2 that wraps around them during production of the bags.

In FIG. 6, in which the lower expansion body 4b has been deprived of one of its plates, an introducer 37 is shown comprising two fingers 37a, which penetrate through the vertical slots 27 from the outside into the lower expansion body 4b, gradually, in the forward direction of the tubular material during the production process of the bags. This introducer 37 enables the tubular material to be folded inwardly, preparing it for the transverse welding that will form the closed bottom of the bag.

FIGS. 4 to 6 show schematically a sealing and cutting device 39, which produces the bottom of the bags. This sealing and cutting device 39 is in itself known and is not described in greater detail because it is not an essential part of the invention.

A preferred characteristic of the plates 35 and 36 is shown in FIG. 4. Specifically, the plates 35 and 36 have a window into which a cover 28 and 29, respectively, is placed, the outer surface of which is a covering material that provides non-stick properties, highly resistant to heat, suitable for serving as a welding back for the welding plates 22 and 23. This covering material may be made of, for example, polytetrafluoroethylene (PTFE).

The invention claimed is:

1. A station for producing bags formed from a supply of a flexible tubular material, and a supply of a flexible sheet material, in the form of a band or bands, to be joined to an outside of the tubular material, comprising:
    an expansion device configured to be inserted vertically and floating inside said tubular material while producing the bags;
    the station further comprising a support on which the expansion device rests with the interposition of the tubular material supplied while producing the bags, wherein the expansion device comprises:
        an upper expansion body configured to cooperate with at least one upper welding group for the joining of the tubular material as the tubular material passes through the upper expansion body with the sheet material arranged between said tubular material and the at least one upper welding group; and
        a lower expansion body configured to cooperate with at least one lower welding group for the joining of the tubular material as the tubular material passes through the lower expansion body with the sheet material arranged between said tubular material and the at least one lower welding group;
    wherein the upper and lower expansion bodies are mechanically linked to one another with capacity of movement with respect to each other; and
    wherein the upper expansion body and the lower expansion body are joined by a transverse shaft;
    wherein the at least one upper welding group is disposed at a position along a conveying path of the tubular material that overlaps with a location on the conveying path of the upper expansion body;
    wherein the at least one lower welding group is disposed at a position along the conveying path that overlaps with a location on the conveying path of the lower expansion body; and
    wherein the upper expansion body is disposed at a position along the conveying path of the tubular material that is upstream of the lower expansion body.

2. The station for producing bags according to claim 1, wherein the upper expansion device body rests on the support and the lower expansion body is suspended from the upper expansion body.

3. The station for producing bags according to claim 1, wherein the at least one lower welding group comprises two lower welding groups and wherein the lower expansion body comprises two parallel plates that determine two major opposing faces in the lower expansion body, each suitable for cooperating with a corresponding one of the two lower welding groups, wherein said two parallel plates define vertical slots that enable formation of individual folds in the tubular material while the bags are being produced.

4. The station for producing bags according to claim 3, wherein the plates have a cover, the outer surface of which the cover having non-stick properties and high resistance to heat.

5. The station for producing bags according to claim 4, wherein the cover is made of material comprising polytetrafluoroethylene.

6. The station for producing bags according to claim 1, wherein the transverse shaft is horizontally oriented.

7. A station for producing bags formed from a supply of a flexible tubular material, and a supply of a flexible sheet material, in the form of a band or bands, to be joined to an outside of the tubular material, comprising:

an expansion device configured to be inserted vertically and floating inside said tubular material while producing the bags;

the station further comprising a support on which the expansion device rests with the interposition of the tubular material supplied while producing the bags, wherein the expansion device comprises:

an upper expansion body configured to cooperate with at least one upper welding group for the joining of the tubular material as the tubular material passes through the upper expansion body with the sheet material arranged between said tubular material and the at least one upper welding group; and a lower expansion body configured to cooperate with at least one lower welding group for the joining of the tubular material as the tubular material passes through the lower expansion body with the sheet material arranged between said tubular material and the at least one lower welding group;

wherein the upper and lower expansion bodies are mechanically linked to one another with capacity of movement with respect to each other;

wherein with the expansion device resting on the support:

the upper expansion body comprises a first upper support face and a second upper support face opposite one another, each of which supports the tubular material, the at least one upper welding group comprises an upper welding plate configured to cooperate with the first or second upper support face, the lower expansion body comprises a first lower support face and a second lower support face opposite one another, each of which supports the tubular material, the at least one lower welding group comprising a lower welding plate configured to cooperate with the first or second lower support face, and wherein the station for producing bags is configured to actuate, or to actuate and operate, said at least one upper and said at least one lower welding groups individually, simultaneously or coordinately;

wherein the at least one upper welding group is disposed at a position along a conveying path of the tubular material that overlaps with a location on the conveying path of the upper expansion body;

wherein the at least one lower welding group is disposed at a position along the conveying path that overlaps with a location on the conveying path of the lower expansion body; and wherein the upper expansion body is disposed at a position along the conveying path of the tubular material that is upstream of the lower expansion body.

8. The station for producing bags according to claim 7, wherein the at least one upper welding group comprises two upper welding groups and the at least one lower welding group comprises two lower welding groups, and wherein the station is configured to operate a single one of the two upper welding groups on one side of the expansion device and a single one of the two lower welding groups arranged on an opposing side of the expansion device.

9. The station for producing bags according to claim 8, configured so that the single one of the two upper welding groups and the single one of the two lower welding groups operate simultaneously.

10. The station for producing bags according to claim 7, wherein the at least one upper welding group two upper welding groups, and wherein the upper expansion body comprises a rigid support frame for two pairs of welding backs, each pair of the welding backs determining one of the first and second upper support faces in the upper expansion body suitable for cooperating with an associated one of the two upper welding groups.

11. The station for producing bags according to claim 10, wherein the welding backs of a same pair are rotatably mounted on a common shaft transverse to the upper expansion body, wherein the common shaft is essentially horizontal when the expansion device rests on the support.

12. The station for producing bags according to claim 7 wherein the support on which the expansion device rests is a pair of rollers rotatable about respective rotation axes that are parallel and at a same level in a vertical direction and positioned on the lower end of the upper expansion body.

13. The station for producing bags according to claim 12, wherein the upper end of the lower expansion body is arranged between the pair of rotating rollers on which the expansion device rests.

14. A station for producing bags formed from a supply of a flexible tubular material, and a supply of a flexible sheet material, in the form of a band or bands, to be joined to an outside of the tubular material, comprising:

an expansion device configured to be inserted vertically and floating inside said tubular material while producing the bags;

the station further comprising a support on which the expansion device rests with the interposition of the tubular material supplied while producing the bags, wherein the expansion device comprises:

an upper expansion body configured to cooperate with at least one upper welding group for the joining of the tubular material as the tubular material passes through the upper expansion body with the sheet material arranged between said tubular material and the at least one upper welding group; and a lower expansion body configured to cooperate with at least one lower welding group for the joining of the tubular material as the tubular material passes through the lower expansion body with the sheet material arranged between said tubular material and the at least one lower welding group;

wherein the upper and lower expansion bodies are mechanically linked to one another with capacity of movement with respect to each other;

wherein with the expansion device resting on the support:

the upper expansion body comprises a first upper support face and a second upper support face opposite one another, each of which supports the tubular material, the at least one upper welding group comprises an upper welding plate configured to cooperate with the first or second upper support face, the lower expansion body comprises a first lower support face and a second lower support face opposite one another, each of which supports the tubular material, the at least one lower welding group comprising a lower welding plate configured to cooperate with the first or second lower support face, wherein the station for producing bags is configured to actuate, or to actuate and operate, said at least one upper and said at least one lower welding groups individually, simultaneously or coordinately; and wherein the at least one upper welding group comprises two upper welding groups, and wherein the upper expansion body comprises a rigid support frame for two pairs of welding backs, each pair of the welding backs determining one of the first and second upper support faces in the upper expansion body suitable for cooperating with an associated one of the two upper welding groups.

15. A station for producing bags formed from a supply of a flexible tubular material, and a supply of a flexible sheet material, in the form of a band or bands, to be joined to an outside of the tubular material, comprising:
an expansion device configured to be inserted vertically and floating inside said tubular material while producing the bags;
the station further comprising a support on which the expansion device rests with the interposition of the tubular material supplied while producing the bags, wherein the expansion device comprises:
an upper expansion body configured to cooperate with at least one upper welding group for the joining of the tubular material as the tubular material passes through the upper expansion body with the sheet material arranged between said tubular material and the at least one upper welding group; and
a lower expansion body configured to cooperate with at least one lower welding group for the joining of the tubular material as the tubular material passes through the lower expansion body with the sheet material arranged between said tubular material and the at least one lower welding group;
wherein the upper and lower expansion bodies are mechanically linked to one another with capacity of movement with respect to each other;
wherein with the expansion device resting on the support:
the upper expansion body comprises a first upper support face and a second upper support face opposite one another, each of which supports the tubular material, the at least one upper welding group comprises an upper welding plate configured to cooperate with the first or second upper support face,
the lower expansion body comprises a first lower support face and a second lower support face opposite one another, each of which supports the tubular material, the at least one lower welding group comprising a lower welding plate configured to cooperate with the first or second lower support face;
wherein the station for producing bags is configured to actuate, or to actuate and operate, said at least one upper and said at least one lower welding groups individually, simultaneously or coordinately; and
wherein the support on which the expansion device rests is a pair of rollers rotatable about respective rotation axes that are parallel and at a same level in a vertical direction and positioned on the lower end of the upper expansion body.

* * * * *